United States Patent
Furman

(10) Patent No.: US 7,370,566 B2
(45) Date of Patent: May 13, 2008

(54) COMPLIMENTARY RETROGRADE/PROGRADE SATELLITE CONSTELLATION

(75) Inventor: Michael J. Furman, Lutherville, MD (US)

(73) Assignee: Harris Corporation, Melbourne, FL (US)

( * ) Notice: Subject to any disclaimer, the term of this patent is extended or adjusted under 35 U.S.C. 154(b) by 113 days.

(21) Appl. No.: 11/347,128

(22) Filed: Feb. 3, 2006

(65) Prior Publication Data

US 2007/0284482 A1    Dec. 13, 2007

Related U.S. Application Data

(62) Division of application No. 10/656,951, filed on Sep. 4, 2003, now abandoned.

(51) Int. Cl.
*B64D 1/04* (2006.01)
*B64G 1/00* (2006.01)

(52) U.S. Cl. .................. 89/1.11; 244/158.4; 370/316

(58) Field of Classification Search ............ 244/158.4, 244/158.5, 158.6; 89/1.11; 370/316
See application file for complete search history.

(56) References Cited

U.S. PATENT DOCUMENTS

| | | | | |
|---|---|---|---|---|
| 3,706,141 A | * | 12/1972 | McGraw ...................... | 434/140 |
| 4,809,935 A | * | 3/1989 | Draim ...................... | 244/158.4 |
| 4,854,527 A | * | 8/1989 | Draim ...................... | 244/158.4 |
| 5,199,672 A | * | 4/1993 | King et al. ............... | 244/173.3 |
| 5,551,624 A | * | 9/1996 | Horstein et al. ........... | 455/12.1 |
| 5,582,367 A | * | 12/1996 | Castiel et al. ............. | 244/158.4 |
| 5,669,585 A | * | 9/1997 | Castiel et al. ............. | 244/158.4 |
| 5,788,187 A | * | 8/1998 | Castiel et al. .............. | 455/12.1 |
| 5,845,206 A | * | 12/1998 | Castiel et al. .............. | 455/13.4 |
| 5,906,337 A | * | 5/1999 | Williams et al. .......... | 244/158.4 |
| 5,911,389 A | * | 6/1999 | Drake ...................... | 244/158.4 |
| 5,957,409 A | * | 9/1999 | Castiel et al. ............. | 244/158.4 |
| 5,971,324 A | * | 10/1999 | Williams et al. .......... | 244/158.4 |

(Continued)

OTHER PUBLICATIONS

"Militarisation of space." Wikipedia, The Free Encyclopedia. Nov. 16, 2006, 13:50 UTC. Wikimedia Foundation, Inc. Nov. 20, 2006 <http://en.wikipedia.org/w/index.php?title=Militarisation_of_space&oldid=88202320>.*

(Continued)

*Primary Examiner*—J. Woodrow Eldred
(74) *Attorney, Agent, or Firm*—Darby & Darby; Robert J. Sacco

(57) ABSTRACT

A method for sensing and monitoring ICBM threats using a constellation of earth orbiting satellites. The method includes arranging a first and a second plurality of threat sensing satellites in earth orbit. The first plurality is selected to have a first prograde orbit plane with a first inclination angle between about 30° to 70° with respect to the earth's equator and an Argument of Perigee equal to about 270°. The second plurality is selected to have a first retrograde orbit plane with a second inclination angle between about 110° to 150° with respect to the earth's equator and an Argument of Perigee equal to about 270°. The second inclination angle is selected to be a symmetric conjugate of the first inclination angle. The first and second plurality of threat sensing satellites are distributed respectively within the first prograde and first retrograde orbits with a Walker distribution of T/P/1. Synchronization of a plurality of epochs of the first plurality of satellites with a plurality of epochs of the second plurality of satellites is performed to provide uniform inter-plane satellite spacing for improved monitoring of an ICBM threat.

10 Claims, 4 Drawing Sheets

U.S. PATENT DOCUMENTS

| | | | | |
|---|---|---|---|---|
| 6,062,511 A * | 5/2000 | Cussac | ........................ | 244/168 |
| 6,102,335 A * | 8/2000 | Castiel et al. | ............. | 244/158.4 |
| 6,182,927 B1 * | 2/2001 | Galvin | ..................... | 244/158.4 |
| 6,263,188 B1 * | 7/2001 | Castiel et al. | ............... | 455/13.1 |
| 6,305,646 B1 * | 10/2001 | McAllister et al. | ....... | 244/158.8 |
| 6,502,790 B1 * | 1/2003 | Murphy | ................... | 244/158.4 |
| 6,553,286 B2 * | 4/2003 | Turner et al. | .................. | 701/13 |
| 6,577,864 B2 * | 6/2003 | Castiel et al. | ............... | 455/427 |
| 6,597,989 B2 * | 7/2003 | Castiel | ........................ | 701/226 |
| 6,611,683 B1 * | 8/2003 | Castiel et al. | ............... | 455/427 |
| 6,666,401 B1 * | 12/2003 | Mardirossian | .............. | 244/3.11 |
| 6,672,542 B2 * | 1/2004 | Peterson | ................... | 244/158.6 |
| 6,678,519 B2 * | 1/2004 | Castiel et al. | ............... | 455/427 |
| 6,701,126 B1 * | 3/2004 | Draim | ........................ | 455/13.1 |
| 6,714,521 B2 * | 3/2004 | Draim | ......................... | 370/316 |
| 6,726,152 B2 * | 4/2004 | Higgins | ................... | 244/158.4 |
| 6,795,687 B1 * | 9/2004 | Castiel et al. | ............... | 455/13.1 |
| 6,868,316 B1 * | 3/2005 | Stevens | ........................ | 701/13 |
| 2001/0012759 A1 * | 8/2001 | Castiel et al. | ............... | 455/12.1 |
| 2001/0051521 A1 * | 12/2001 | Castiel et al. | ................ | 455/429 |
| 2002/0132577 A1 * | 9/2002 | Draim | ........................ | 455/12.1 |
| 2002/0136191 A1 * | 9/2002 | Draim et al. | ................ | 370/344 |

OTHER PUBLICATIONS

"Anti-ballistic missile." Wikipedia, The Free Encyclopedia. Nov. 13, 2006, 07:08 UTC. Wikimedia Foundation, Inc. Nov. 20, 2006 <http://en.wikipedia.org/w/index.php?title=Anti-ballistic_missile&oldid=87495968>.*

"Intercontinental ballistic missile." Wikipedia, The Free Encyclopedia. Nov. 20, 2006, 00:46 UTC. Wikimedia Foundation, Inc. Nov. 20, 2006 <http://en.wikipedia.org/w/index.php?title=Intercontinental_ballistic_missile&oldid=88910960>.* epoch. The American Heritage® Dictionary of the English Language, Fourth Edition. Houghton Mifflin Company, 2004. Answers.com Nov. 20, 2006. http://www.answers.com/topic/epoch.*

* cited by examiner

COMPLIMENTARY RETROGRADE/PROGRADE SATELLITE CONSTELLATION

This application is a divisional application of co-pending U.S. patent application Ser. No. 10/656,951 filed on Sep. 4, 2003.

BACKGROUND OF THE INVENTION

1. Statement of the Technical Field

The inventive arrangements relate generally to the field of satellite systems, and more particularly to a constellation of satellites.

2. Description of the Related Art

Earth satellites are used for a wide variety of civilian and military purposes. In the civilian realm, these purposes can include weather, communications, mapping, and resource exploration. Satellites used for military purposes can serve as communication links, surveillance platforms and weapons systems. Global positioning system (GPS) satellites are commonly used for both civilian and military purposes.

In many instances, two or more satellites must operate in a cooperative arrangement in order to satisfy mission requirements. Such groups of satellites are called constellations. For example, in the field of communications, multiple satellites may be required to provide radio signal relay coverage over a particular political or geographic region. Similarly, GPS systems typically require terrestrial GPS receivers to receive signals simultaneously from multiple satellites. U.S. Pat. No. 5,551,624 discloses a constellation of telecommunications satellites that exclusively makes use of prograde orbits to provide 24-hour cellular telephone communication coverage over a predetermined latitude range around the world. This predetermined latitude range can be thought of as a band that encircles a selected portion of the earth. This band defines a zone of operational utility for a constellation of satellites and the purpose of each mission is to act or do something within this band. For example, a band could extend from the equator to the north pole. In that case, the band would include the entire northern hemisphere of the earth.

A satellite's motion is confined to a plane that is fixed in space. This plane is often referred to as the orbital plane. The orbital plane always goes through the center of the earth, but may be tilted any angle relative to the equator. Inclination is the angle between the orbital plane and the equatorial plane. Alternatively, a vector h can be defined perpendicular to the orbital plane. Similarly, a vector K can be defined aligned with the celestial north pole of the earth. The angle defined between the vector h and the vector K is also the inclination angle of the orbital plane. The operational band of a satellite as described above is substantially determined by the inclination angle of the satellite's orbit and orbit altitude. For example in the case where a low earth orbit (LEO) satellite (altitude between 1000 km to 3000 km) has an orbit with a 60° inclination, the band would run from about 55° to 65°. Similarly a satellite that has an orbit with a 30° inclination would have an operational band that extends from about 25° to 35°. Those skilled in the art will appreciate that the operational band is not exactly symmetric about the inclination angle, but for a circular orbit, the foregoing estimates are reasonably accurate. Notably, prograde orbits have inclination angles between 0° and up to 90°. Retrograde orbits have inclination angles between 90° and 180°.

Relative motion for a prograde orbit will be opposite to the relative motion for a retrograde orbit. Conventionally, satellite motion for a prograde orbit is east to west. When the inclination angle is rotated such that a prograde orbit is produced, the same orbital rotation will cause the satellite to have a west to east relative motion with respect to the earth.

In the field of military surveillance, more than one satellite may be required for ensuring that a satellite will have a view of a particular geographic location on a regular and timely basis. For example, missile detection and tracking systems can require nearly constant monitoring of large geographic areas located at various locations around the earth. In those instances where global or global sector (a band formed by upper and lower latitude lines on the earth) coverage is required, a number of satellites are required so that at least one satellite can be seen from every point within the global or geodetic sector of interest. In addition to ground coverage, an ephemeris dataset can be defined that describes a trajectory of interest.

Other considerations of importance when selecting the satellite constellation orbits include the need to 1) maximize satellite-to-ground terminal connectivity (minimizes latency for all ground functions), 2) maximize satellite-to-trajectory visibility time (enhances trajectory discrimination), 3) minimize the range between satellite-to-trajectory (for optimal sensor resolution), and 4) maximize the design life of each satellite by avoiding intense Van Allen Belt ionization regions and cosmic radiation surrounding the earth.

It is well known that satellites and the launch vehicles required for such satellites are very expensive. Accordingly, it is essential to select a constellation that accomplishes the goals of the mission with a minimum number of satellites. The constellation chosen should also have orbits that support the longest design life in terms of orbit decay, and radiation damage. Another factor to consider when selecting satellite constellations is the need in certain instances for satellite to communicate with ground controllers, satellites, and other resources. This can be accomplished directly via inter-satellite links (ISLs) that relay the ground communication to the desired satellite within the constellation. Ideal conditions for ISLs can be established and maintained because relative satellite motion within an orbit plane is nearly zero.

SUMMARY OF THE INVENTION

The present invention concerns a method and a constellation of satellites for northern hemisphere ICBM threat sensing and corresponding interceptor communications support against ICBM threats. The constellation includes a first plurality of threat sensing satellites having a prograde orbit plane with a first defined inclination with respect to the equator and a second plurality of threat sensing satellites having a retrograde orbit plane and a second defined inclination. The retrograde orbit plane is a symmetric conjugate of the prograde orbit plane and each of the first and second plurality of threat sensing satellites have a predetermined apogee and perigee. The predetermined apogee can be selected from the range of 100 km and 10,000 km. The predetermined perigee can be selected from the range of 100 km to 10,000 km. The first and second defined inclinations can be between about 30° to 70° and 110° to 150°, respectively, with respect to the equator.

According to one aspect of the invention, as few as 5 or as many as 30 satellites can be distributed in each orbit plane. According to another aspect of the invention, the first and second plurality of satellites can each have Walker distributions of T/P/1. Further, the epochs of the first plurality of threat sensing satellites can advantageously be synchronized with the epochs of the second plurality of threat sensing satellites to provide uniform inter-plane satellite spacing.

According to another aspect of the invention the retrograde and the prograde orbits each have an Argument of Perigee equal to 270°. This will position the apogee at the maximum northern hemisphere latitude traversed by the orbit.

According to another aspect of the invention, at least one of the first and second plurality of threat sensing satellites can have a Walker number selected from the group consisting of 5/1/1, 6/1/1, and 6/2/1.

According to yet another aspect of the invention, the constellation can include a third plurality of threat sensing satellites having a second prograde orbit plane with a third defined inclination with respect to the equator. Further, a fourth plurality of threat sensing satellites can be provided having a second retrograde orbit plane and a fourth defined inclination, where the second retrograde orbit plane is a symmetric conjugate of the second prograde orbit plane. The second prograde orbit plane and the second retrograde orbit plane can be identical to the first prograde orbit plane and the first retrograde orbit plane, respectively, with the exception of being longitudinally rotated 90°.

DETAILED DESCRIPTION OF THE PREFERRED EMBODIMENTS

Figure 1A:
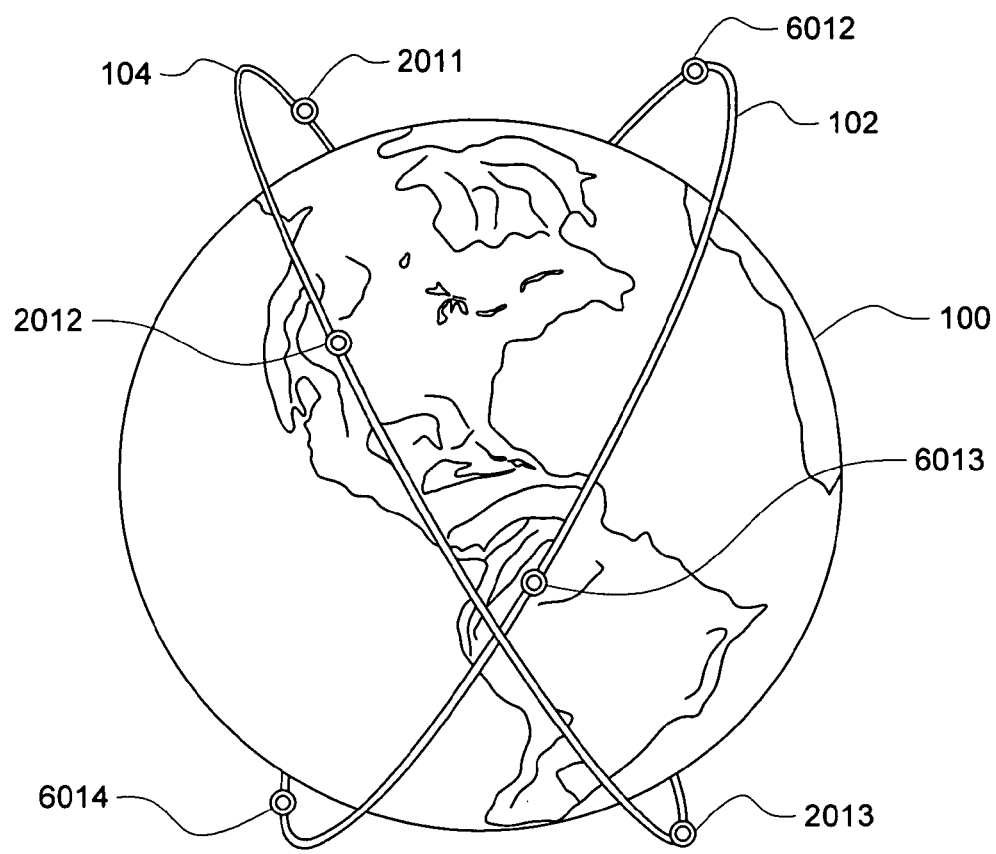
FIG. 1A is an orthographic illustration showing two symmetric (conjugate) orbital planes (prograde at 60° and retrograde at 120°) that is useful for understanding the satellite constellation of the invention.

A challenge of most large-scale satellite projects is the capability to realize mission goals given the allocated budget. The cost for on-orbit delivery of each satellite can be on the order of one billion dollars. A cost control factor for any satellite project is clearly related to number of satellites in the constellation. This invention concerns an optimized constellation that can provide improved satellite visibility and accessibility for a variety of communications and sensing tasks. The optimized constellation (OC) provides better sensor and communication coverage than other approaches and with fewer satellites. The constellation is especially well suited to ICBM/Northern hemisphere threat sensing and corresponding interceptor communications support against such threats and for that reason shall be described herein primarily in relation to that application. Still, it should be understood that the use of the constellation is not limited to this particular application, but can include any communication and/or sensing application where it can offer improved coverage and a lesser number of satellites as compared to other arrangements.

For the purposes of missile threat detection and tracking, it is advantageous that any satellite constellation system 1) maximize satellite-to-ground terminal connectivity (to minimize latency for all functions), 2) maximize satellite-to-interceptor visibility time (to enhance target discrimination for command and control), 3) minimize the range between satellite-to-threat (for optimal sensor resolution), and 4) maximize the design life of each satellite by avoiding intense ionization regions surrounding the earth.

It is also extremely important to have nearly 100% ground communications and trajectory visibility. For example, if the trajectory represents a hostile ICBM threat, an adversary may choose to launch at the onset of lost ground communications where the best sensor information cannot be exploited. Any weapons relying on predetermined queuing may loose a substantial amount of battle space due to this latency.

Range between satellite-to-threat is important for both sensor resolution, and communications range loss. Minimizing range enhances both metrics. A satellite orbit that flies in the same direction as the threat simultaneously minimizes satellite-to-threat range, and maximizes satellite-to-threat visibility time. Range is the distance between the nearest satellite in the constellation and the threat. This may vary during the threat or interceptor trajectory.

Design Life is a metric to keep a satellite in orbit for a specific time period. Orbits above 500 Km, suffer minimal atmospheric drag. In such orbits, station keeping propellant, Van Allan Belt radiation, and cosmic radiation dosage are more likely to be the controlling factors with regard to determining spacecraft longevity. Total radiation dosages can be calculated for both solar cell deterioration, and ionospheric electron/proton influences into a 100 Mil thickness aluminum spacecraft body. Van Allen effect are highly correlated to elevation angle (South Atlantic Anomaly), and cosmic radiation to orbit altitude.

In typical ICBM threat/interceptor scenarios, the threat flies East-to-West (or West-to-East), including near polar trajectories, while the interceptor flies in the opposite or same (tail chase) direction. With few exceptions, all such missile activity is flown in the Northern hemisphere. Accordingly, a constellation used for threat detection and interception should advantageously have orbital properties that match such threat and interceptor trajectories. For example, the constellation should advantageously have a satellite constellation motion that most generally mimics the above mentioned threat and interceptor motion. According to a preferred embodiment, this can be achieved by using conjugate inclination orbit planes. Namely, a retrograde orbit plane (East-to-West motion) that is symmetric with the prograde orbit plane (West-to-East motion). Further, the satellite constellation should advantageously dwell in the Northern Hemisphere—by using an eccentric orbit.

One example of a satellite constellation that advantageously addresses the foregoing criteria is illustrated in FIG. 1A. The constellation in FIG. 1A includes a prograde orbit plane 102 having an inclination of 60° and a retrograde orbit plane 104 having an inclination of 120°, each disposed about the earth 100. However, it should be understood that the specific angles selected for the prograde and retrograde orbits can be varied between about 30° to 70° and 110° to 150° respectively within the scope of the invention. The constellation can include a plurality of satellites equally spaced in each of the orbit planes 102, 104. For example, orbit plane 102 can include six equally spaced satellites 6011, 6012, 6013, 6014, 6015, 6016. Similarly, orbit plane 104 can have six equally spaced satellites 2011, 2012, 2013, 2014, 2015, 2016. The orbits of the satellites 2011, 2012, 2013, 2014, 2015, 2016 in the retrograde orbit 104 can be further restricted so that the equatorial crossing occurs substantially mid-period to the equatorial crossings of the prograde satellites 6011, 6012, 6013, 6014, 6015, 6016. Some of the satellites are not visible in FIG. 1A because they are obstructed from view by the earth. In any case, it should be understood that the invention is not limited to the specific number of satellites and orbit planes shown in FIG. 1A. Instead, as many as 600 satellites distributed over as many as 300 different orbit planes are possible.

In the example of FIG. 1A, satellites in both orbit planes 102, 104 have an apogee and perigee of 2000 km and 900 km respectively, but these numbers can be varied parametrically to evaluate the best combination to 1) maximize satellite-to-ground terminal connectivity (to minimize latency for all functions), 2) maximize satellite-to-interceptor visibility time (to enhance target discrimination for command and control), 3) minimize the range between satellite-to-threat (for optimal sensor resolution), and 4) maximize the design life of each satellite by avoiding intense ionization regions surrounding the earth.

The exemplary satellite constellation shown in FIG. 1A is optimized for surveillance of an ICBM missile trajectory (not shown) because the common geospatial coverage between all satellites is minimized. The equally spaced satellites in each of the orbit planes 102, 104 spend minimal time in overlap. Accordingly, the number of satellites required to constantly cover the desired latitude band is therefore minimized. Further, the resulting orbit dwell time, and visibility of the Northern Hemisphere is enhanced, at the expense of reduced Southern hemisphere coverage and dwell time.

Figure 1B:
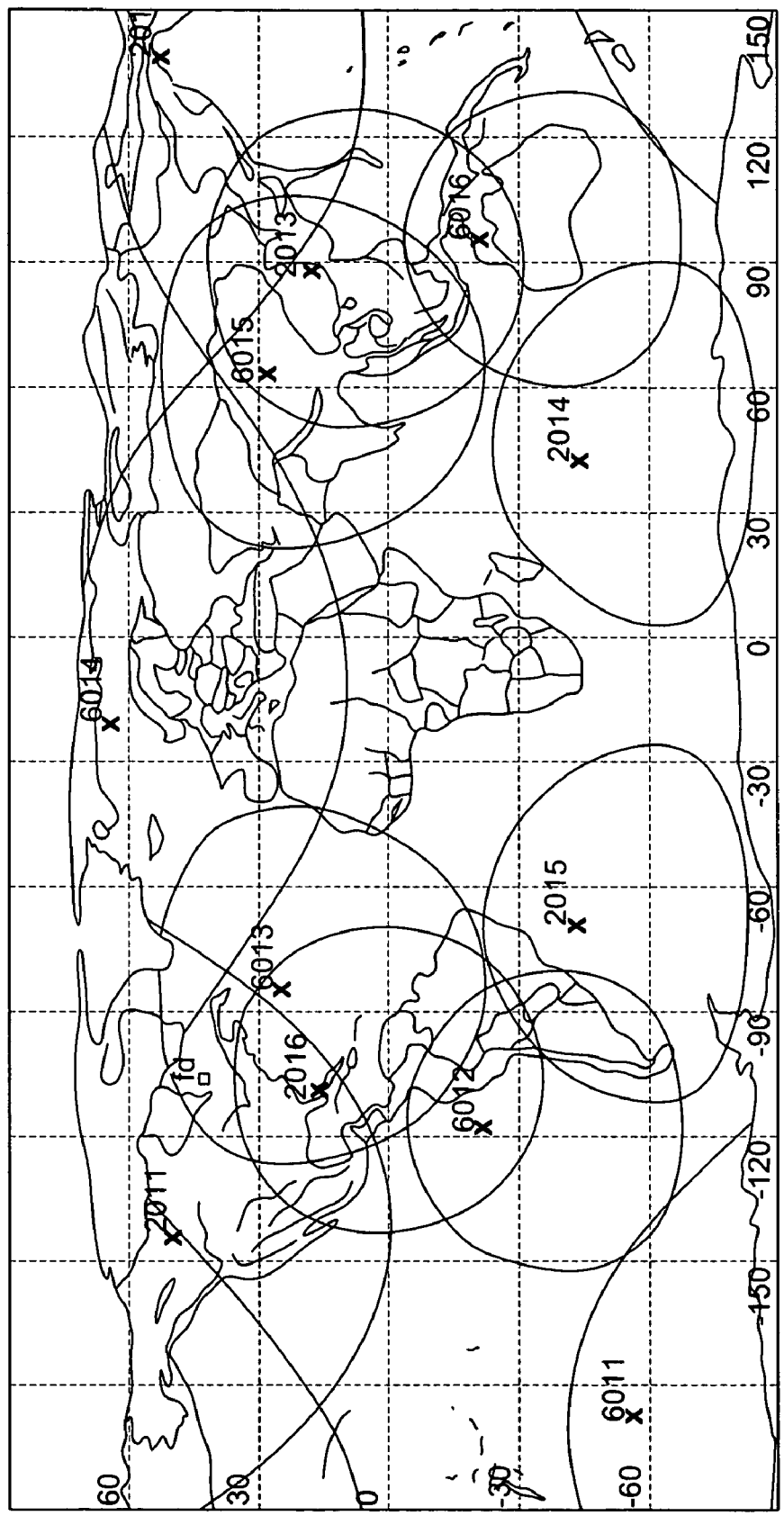
FIG. 1B is a mercator illustration of satellite visibility using the satellite constellation configuration shown orthographically in FIG. 1A.

FIG. 1B is a mercator illustration of satellite visibility using the satellite constellation configuration shown orthographically in FIG. 1A. Each of the satellites 6011, 6012, 6013, 6014, 6015, 6016 and 2011, 2012, 2013, 2014, 2015, 2016 are shown as a small 'x' in the center of a distorted circle. The distortion of this circle is characteristic of mercator projection, which is highly distorted at the poles, and not distorted at the equator. The circles surrounding each of the satellites represent the ground visibility each satellite has at that point in its orbit. It may be observed in FIG. 1B that satellites in the Northern Hemisphere have more ground visibility (larger circles) than Southern Hemisphere satellites (smaller circles). Further, it can be observed that there is only minimal overlap between satellite pairs 6011/6012, and 2015/2016 (Southern Hemisphere), while broad overlap occurs with satellite sets in the Northern hemisphere (6015/6014/6013 and 2010/2011/2016). This is beneficial because most ICBM threats and interceptors fly in the Northern Hemisphere.

Argument of Perigee is the angle along the orbital path between the Ascending Node and the Perigee. It ranges in value between 0° and 360°. Zero degrees and 180 degrees are equatorial crossing for the ascending/descending nodal crossings, respectively. Ninety Degrees and 270° represent the zenith and lowest point in the orbit. Northern hemisphere biasing for ICBM threat sensing and interceptor communications support is accomplished by placing apogee orbit zenith. This is uniquely accomplished by selecting an Argument of Perigee value equal to 270° for all orbits as illustrated in FIG. 1A. Apogee will determine sensor performance because the range distances between the spacecraft and observation/communication object(s) relate to the quality of the service.

As noted above, each of the satellites in the retrograde and prograde orbits 102, 104 is preferably equally spaced. Walker Orbits can be used to ensure equal inter-plane and intra plane satellite spacing. As is well known in the art, the Walker Orbit constellation is an algorithmic way to disperse satellites into orbit planes, and disperse orbit planes globally with respect to longitude distribution. A Walker number has three components, T/P/F, that define the constellation geometry. Typically all dispersal parameters are uniform so the satellites will tend to have uniform global coverage. In this method T is the total number of satellites, P is the total number of orbit planes and F is the true anomaly phasing unit between planes. The T satellites are equally divided among P orbital planes, and the P orbital planes are equally spaced in RAAN. Satellites within an orbital plane are equally spaced in argument of latitude. The phasing or mean anomaly difference between satellites in adjacent orbital planes is F·360°/T. In the present invention, all orbit planes preferably use F equal 1 for maximum inter-plane spacing. As an example, T/P/F parameters of 12/2/1 describe 12 sat satellites/two planes (six satellites per plane)/equal intra-plane spacing distribution over the plane. The two orbit planes would be separated by 90° longitude, and when the first satellite is at its ascending node (equatorial crossing), the first satellite in the second plane is at zenith (highest Northern latitude).

Relative satellite position along the orbit path are set by their epoch time to give them equal spacing around the plane. This is achieved in the present invention by setting the Walker "F" value equal to 1. This can also be expressed as T/P/1.

Epoch time for the Walker distribution of the constellation in FIG. 1A follows:

$$\text{Epoch Time} = Tp*(n-1)/s$$

Where:
Tp=Orbit Period (determined from Keplerian parameters)
n=satellite # in plane (1 thru 6)
s=number of satellites per plane Epoch times for the constellation in FIG. 1A generate an inter-plane satellite separation of 60°. Conjugate or retrograde orbit epoch times are initially staggered by 30° from the prograde plane. Retrograde epoch times are given by:

$$\text{Epoch Time} = Tp*(n-1)/s + Tp/2s$$

Where:
Tp=Orbit Period (determined from Keplerian parameters)
Tp/2s=½ of the adjacent inter-plane satellite spacing
n=satellite # in plane (for this example n=1 thru 6)
s=number of satellites per plane The staggered epoch times of the retrograde orbits advantageously allow for minimal overlap of intra-plane satellites, while the linear distribution {(n−1)/s factor} provides for maximum inter-plane spacing.

Figure 2A:
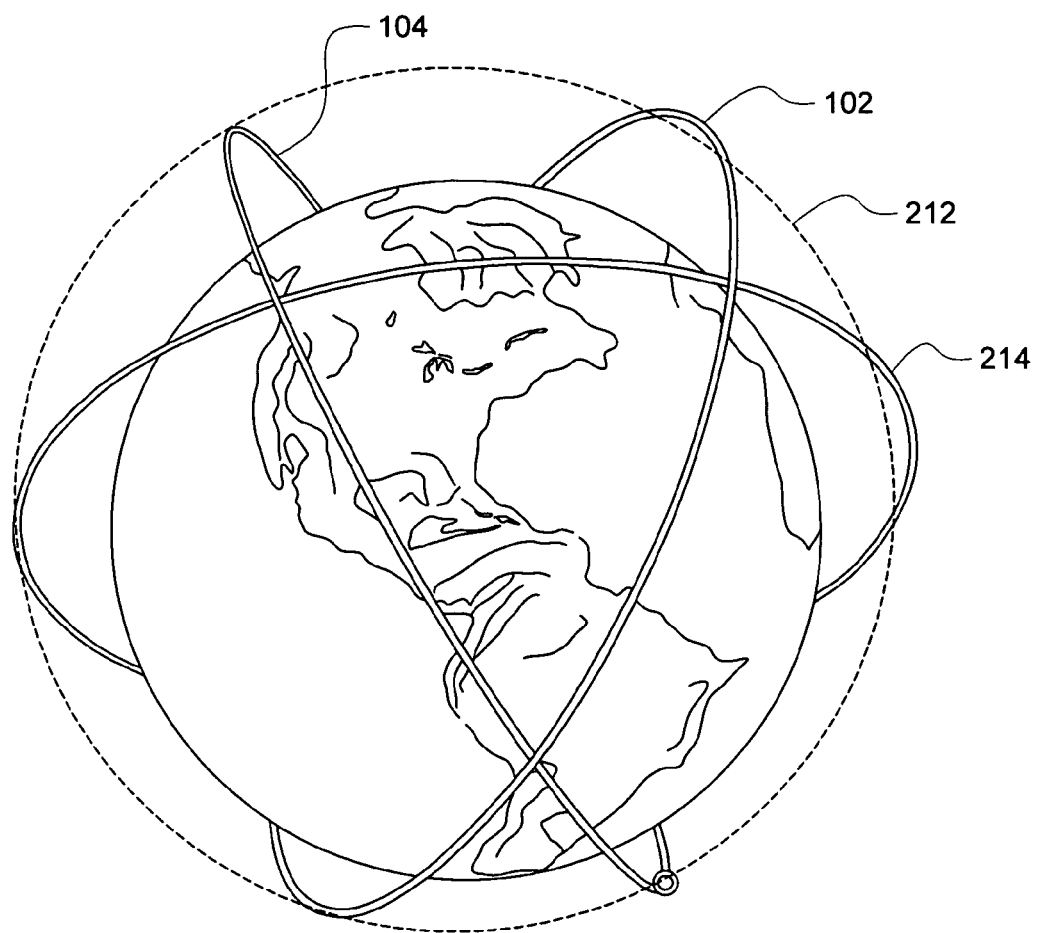
FIG. 2A is an orthographic illustration of satellite visibility using a four plane satellite constellation configuration.

FIG. 2A is another example of a satellite constellation in accordance with the inventive arrangements. FIG. 2A shows a 12-ball Mihail satellite constellation with 4-planes, 3 satellites per orbit plane, in conjugate 60°/120° inclinations. (Walker 6/3/1). These include orbital planes 102, 104 as previously described relative to FIG. 1A and orbital planes 212, 214 that are identical to orbital planes 102, 104 with the exception of being longitudinally rotated 90° (Walker F=1). Orbital plane 212 is a prograde 60° orbit plane and orbit plane 214 is a retrograde 120° orbit plane. As was the case with the orbits in FIG. 1A, northern hemisphere biasing for ICBM threat sensing and interceptor communications support is accomplished by selecting an Argument of Apogee value equal to 270° for all orbits. For greater clarity, individual satellites are not shown in FIG. 2A.

Figure 2B:
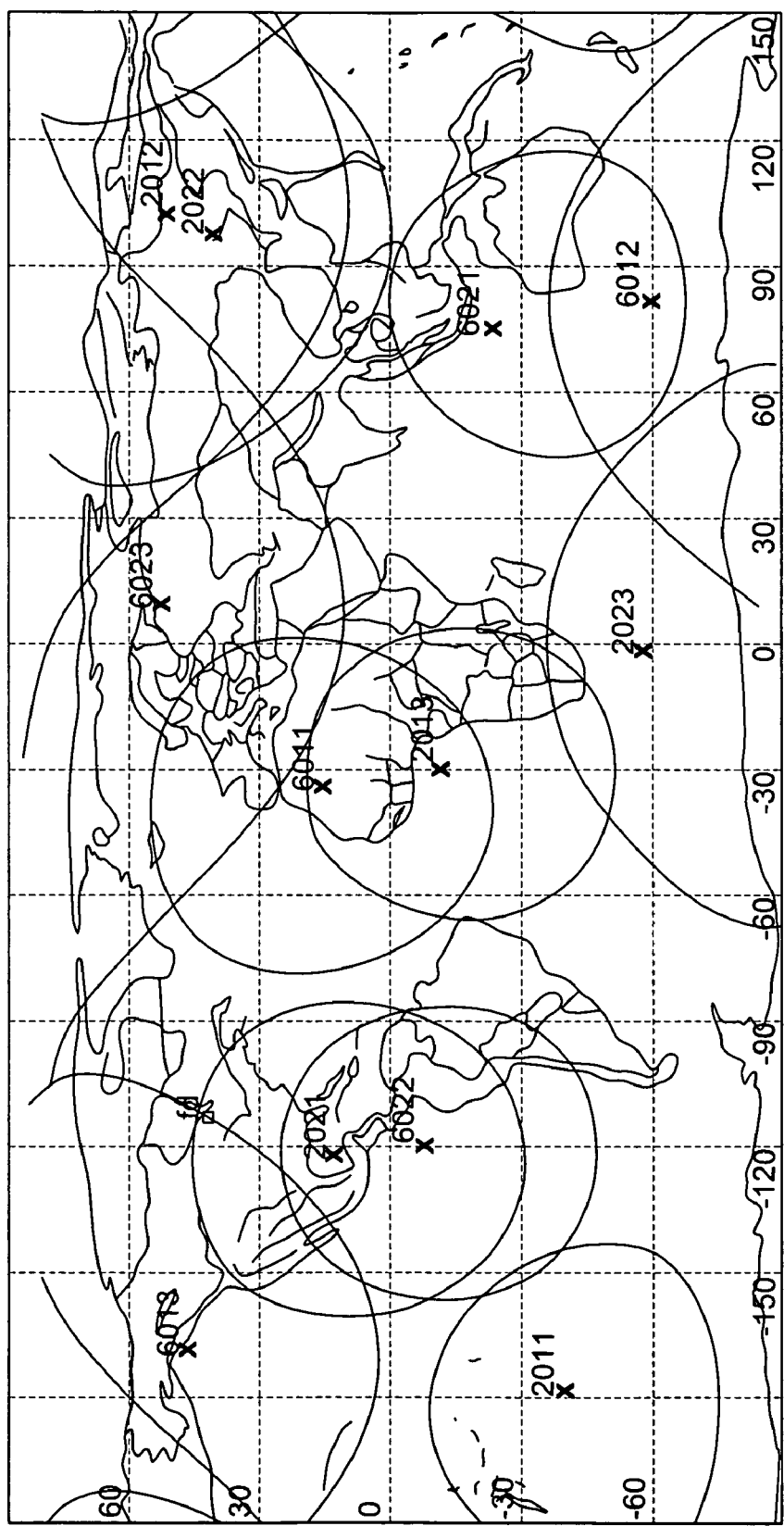
FIG. 2B is a mercator illustration of satellite visibility using the satellite constellation configuration shown orthographically in FIG. 2A.

FIG. 2B is a mercator illustration of satellite visibility using the satellite constellation configuration shown orthographically in FIG. 2A. Each of the satellites 6011, 6012, 6013, 6021, 6022, 6023 and 2011, 2012, 2013, 2021, 2022, 2023 are shown as a small 'x' in the center of each distorted circle. The circles surrounding each of the satellites represent the ground visibility each satellite has at that point in its orbit.

FIGS. 1A, 1B, 2A and 2B are illustrative of the basic concept of a retrograde/prograde orbit plane arrangement for a satellite constellation that is advantageous for ICBM threat and interceptor surveillance. However, the invention is not limited to the specific arrangements described in these examples. Instead, the constellation can include a variety of combinations. Table 1 presents a set of values that are presently believed can provide acceptable results. Those skilled in the art will appreciate that the orbit characteristics for the specific trade space are chosen via parametric evaluation of combinations, selecting one choice per column from Table 1.

TABLE 1

| Total # of Planes | # sats per plane | Inclination Prograde/ Retrograde | Apogee | Perigee | Walker T/P/F (for each prograde & retrograde orbit plane) |
|---|---|---|---|---|---|
| 2 | 6 | 30/150 | 1000 | 900 | 5/1/1 |
| 4 | 5 | 40/140 | 1050 | 1000 | 6/1/1 |
|   | 3 | 50/130 | 2000 | 1050 | 6/2/1 |
|   |   | 57/123 | 3000 | 2000 |   |
|   |   | 60/120 |   |   |   |
|   |   | 70/110 |   |   |   |

As will be apparent from the foregoing, the orbit plane has a slight orbital eccentricity whereby the apogee is located at maximum northern hemisphere latitude (Argument of Perigee=270°). The resulting orbit dwell time and visibility of the Northern Hemisphere is enhanced, at the expense of reduced Southern hemisphere coverage and dwell time.

As noted above, it is extremely important to have nearly 100% communications and surveillance availability, as any non-connected time represents a latency that can be exploited by a savvy adversary. In order to ensure substantially continuous observation of threat activity, multiple satellites can be used in each orbital plane. For example, five or six satellites can be provided in each of said retrograde and prograde orbital planes. Further, the constellation of satellites in each of the orbital planes can have synchronized epochs so that geospatial coverage is maximized, and common visibility overlap is minimized. Further, the plurality of the constellation configuration insures that west-to-east flying threats (or interceptors) are substantially visible (and closer) to prograde orbits, and east-to-west flying threats (or interceptors) are substantially visible (and closer) to retrograde orbits. Further, the constellation configuration insures that there is at least one satellite (either retrograde or prograde) that is substantially always available to view threats, or a predetermined political or geographic location. The use of equally spaced multiple satellites per orbital plane ensures an equal geospatial distribution of the satellites. The use of conjugate retrograde/prograde orbits enriches the geospatial distribution and provides increased visibility coverage to threats or interceptors that have east-to-west or west-to-east motion.

The satellite constellations disclosed in FIGS. 1-2 maximize satellite-to-ground terminal connectivity. This can be shown by conventional numerical simulation programs that can propagate the constellation ephemeredes for a 1-month duration, and compute ranges from the constellation to a ground terminal. Such an analysis also allows the visibility gaps between the ground terminal and the constellation to be computed. Ground terminals in FIGS. 1B and 2B are shown as a small box identified with the reference letters "s" and "fd".

The satellite constellations disclosed in FIGS. 1-2 also minimize the range between the constellation and the threat (or interceptor) trajectory. This feature is important because it allows each satellite to achieve optimal sensor resolution with respect to the threat and also aids with interceptor communications.

The range metric can similarly be shown using conventional numerical simulation programs that propagate the constellation ephemeredes for a one month period. Ranges from each satellite to each missile/satellite trajectory pair for the month simulation period can be computed in this way.

The satellite constellation in FIGS. 1-2 also maximizes satellite-to-interceptor visibility time. This metric results from satellites pairing with interceptors traveling in the same general direction. This is an important feature because it allows each satellite to achieve optimal sensor resolution.

Finally, the satellite constellation disclosed with respect to FIGS. 1-2 provides a further advantage over the prior art to the extent that it maximizes the design life of each satellite by avoiding intense ionization regions surrounding the earth. Specifically, this result is achieved by choosing inclinations/ apogee/perigee parameters that produce minimal Van Allen belt and cosmic radiation damage.

While the preferred embodiments of the invention have been illustrated and described, it will be clear that the invention is not so limited. For example, different optimization metrics can be used. In the foregoing description, range between satellite and threat is used an optimization metric. However, it is also possible to include range rate or a combination of range and range rate. These combinations are simply design metrics of the constellation designer. Numerous modifications, changes, variations, substitutions and equivalents will occur to those skilled in the art without departing from the spirit and scope of the present invention as described in the claims.

The invention claimed is:

1. A method for sensing and monitoring ICBM threats using a constellation of earth orbiting satellites, comprising:

arranging a first plurality of threat sensing satellites in earth orbit with a first, common prograde orbit plane with a first inclination defining a first angle between about 30° to 70° with respect to the earth's equator and an Argument of Perigee equal to about 270°;

arranging a second plurality of threat sensing satellites in earth orbit with a first, common retrograde orbit plane and a second inclination defining a second angle between about 110° to 150° with respect to the earth's equator and an Argument of Perigee equal to about 270°;

selecting said second angle formed by said second retrograde orbit plane to be a symmetric conjugate of said first angle formed by said first prograde orbit plane;

distributing said first and second plurality of threat sensing satellites respectively within said first prograde orbit and said first retrograde orbit with a Walker distribution of T/P/1;

synchronizing a plurality of epochs of said first plurality of threat sensing satellites with a plurality of epochs of said second plurality of threat sensing satellites to provide uniform inter-plane satellite spacing; and monitoring an ICBM threat with at least one of said first and second plurality of threat sensing satellites.

2. The method for sensing and monitoring ICBM threats according to claim 1, further comprising the step of selecting an apogee for said first and second plurality of threat sensing satellites within a range of between about 100 km and 10,000 km.

3. The method for sensing and monitoring ICBM threats according to claim 2, further comprising the step of selecting a perigee for said first and second plurality of threat sensing satellites within a range of between about 100 km and 10,000 km.

4. The method of sensing and monitoring ICBM threats according to claim 1, further comprising the steps of selecting said first plurality of threat sensing satellites to be 5 or 6 threat sensing satellites in said first prograde orbit plane and selecting said second plurality of threat sensing satellites to be 5 or 6 threat sensing satellites in said first retrograde orbit plane.

5. The method of sensing and monitoring ICBM threats according to claim 1, further comprising the step of distributing said first and second plurality of threat sensing satellites respectively within said first prograde orbit and said first retrograde orbit with a Walker distribution selected from the group consisting of 5/1/1, 6/1/1, and 6/2/1.

6. The method of sensing and monitoring ICBM threats according to claim 1, further comprising the steps of:
arranging a third plurality of threat sensing satellites in earth orbit with a second, common prograde orbit plane with a third inclination defining a third angle with respect to the earth's equator;
arranging a fourth plurality of threat sensing satellites in earth orbit with a second, common retrograde orbit plane and a fourth inclination defining a fourth angle with respect to the earth's equator; and
selecting said fourth angle formed by said second retrograde orbit plane to be a symmetric conjugate of said third angle formed by said second prograde orbit plane.

7. The method of sensing and monitoring ICBM threats according to claim 6, further comprising the step of selecting said second prograde orbit plane and said second retrograde orbit plane to be identical to said first prograde orbit plane and said first retrograde orbit plane, respectively, with the exception of being longitudinally rotated 90°.

8. The method of sensing and monitoring ICBM threats according to claim 1, further comprising selecting at least one orbital parameter of said first and second plurality of threat sensing satellites to minimize a range between at least one of said first and second plurality of threat sensing satellites and an anticipated trajectory of an ICBM missile threat.

9. The method of sensing and monitoring ICBM threats according to claim 8, further comprising the step of selecting at least a second orbital parameter of said first and second plurality of threat of threat sensing satellites to minimize a range between at least one of said first and second plurality of threat sensing satellites and an anticipated trajectory of an interceptor vehicle directed toward said ICBM missile threat.

10. The method of sensing and monitoring ICBM threats according to claim 9, further comprising the step of determining an optimized value for at least one of said first and second orbital parameters using a numerical simulation program.

* * * * *